(12) United States Patent
Krijn et al.

(10) Patent No.: US 8,240,854 B2
(45) Date of Patent: Aug. 14, 2012

(54) AUTOSTEREOSCOPIC DISPLAY DEVICE AND A SYSTEM USING THE SAME

(75) Inventors: Marcellinus Petrus Carolus Michael Krijn, Eindhoven (NL); Patrick Peter Elizabeth Meuwissen, Eindhoven (NL); Hans Zuidema, Eindhoven (NL); Willem Lubertus Ijzerman, Eindhoven (NL); Siebe Tjerk De Zwart, Eindhoven (NL); Oscar Hendrikus Willemsen, Eindhoven (NL)

(73) Assignee: Koninlijke Philips Electronics N.V., Eindhoven (NL)

( * ) Notice: Subject to any disclaimer, the term of this patent is extended or adjusted under 35 U.S.C. 154(b) by 547 days.

(21) Appl. No.: 12/518,916

(22) PCT Filed: Dec. 12, 2007

(86) PCT No.: PCT/IB2007/055053
§ 371 (c)(1),
(2), (4) Date: Jun. 12, 2009

(87) PCT Pub. No.: WO2008/075258
PCT Pub. Date: Jun. 26, 2008

(65) Prior Publication Data
US 2010/0033680 A1 Feb. 11, 2010

(30) Foreign Application Priority Data
Dec. 19, 2006 (EP) .................................... 06126456

(51) Int. Cl.
G02B 27/22 (2006.01)
G02B 27/26 (2006.01)
G03B 21/00 (2006.01)
G03B 35/22 (2006.01)
H04N 13/00 (2006.01)

(52) U.S. Cl. ............................. 353/8; 359/458; 359/463
(58) Field of Classification Search ...... 353/8; 359/458, 359/463
See application file for complete search history.

(56) References Cited

U.S. PATENT DOCUMENTS

| | | | |
|---|---|---|---|
| 5,162,897 A | 11/1992 | Jitsukata et al. | |
| 5,812,152 A * | 9/1998 | Torigoe et al. | 347/2 |
| 6,344,926 B1 * | 2/2002 | Arimoto et al. | 359/443 |
| 6,353,508 B1 * | 3/2002 | Burke | 359/742 |
| 6,561,649 B1 | 5/2003 | Burstyn | |
| 6,618,076 B1 | 9/2003 | Sukthankar et al. | |
| 6,703,989 B1 * | 3/2004 | Harrold et al. | 345/32 |
| 6,714,349 B2 * | 3/2004 | Nam | 359/457 |
| 7,139,042 B2 * | 11/2006 | Nam et al. | 349/15 |
| 7,425,070 B2 * | 9/2008 | Hsu | 353/7 |
| 7,648,243 B2 * | 1/2010 | Shestak et al. | 353/7 |
| 7,889,152 B2 * | 2/2011 | Kim et al. | 345/7 |
| 8,035,762 B2 * | 10/2011 | Ijzerman et al. | 349/15 |

(Continued)

FOREIGN PATENT DOCUMENTS

CN 1877444 A 12/2006

(Continued)

*Primary Examiner* — John Lee (57) ABSTRACT

An autostereoscopic display device includes a reflection layer for reflecting at least a portion of incident light, a polarization conversion layer arranged over the reflection layer, and an array of lenticular elements arranged over at least a portion of the polarization conversion layer and including a birefringent material. Light having a first state of polarization is configured to pass through the lenticular element array without substantial lenticular element focusing, where the polarization state is transformed by the polarization conversion layer such that the reflected light has a second state of polarization. Light having the second polarization state passes through the lenticular element array with the lenticular element focusing to provide multiple views to different viewing locations.

20 Claims, 7 Drawing Sheets

Projector

U.S. PATENT DOCUMENTS

| | | |
|---|---|---|
| 2003/0133191 A1 | 7/2003 | Morita et al. |
| 2004/0141156 A1 | 7/2004 | Beardsley et al. |
| 2004/0222945 A1 | 11/2004 | Taira et al. |
| 2005/0213821 A1 | 9/2005 | Matsuda |
| 2006/0098285 A1 | 5/2006 | Woodgate et al. |
| 2006/0119800 A1 | 6/2006 | Burnett et al. |
| 2006/0152679 A1 | 7/2006 | Kim et al. |
| 2006/0152682 A1 | 7/2006 | Matsuda et al. |
| 2006/0291050 A1 | 12/2006 | Shestak et al. |
| 2007/0008406 A1* | 1/2007 | Shestak et al. ............ 348/58 |
| 2007/0035672 A1* | 2/2007 | Shestak et al. ............ 349/15 |
| 2007/0153234 A1* | 7/2007 | Salters et al. ............ 353/8 |
| 2007/0165305 A1* | 7/2007 | Mehrle ............ 359/464 |
| 2008/0036853 A1* | 2/2008 | Shestak et al. ............ 348/51 |
| 2010/0033680 A1* | 2/2010 | Krijn et al. ............ 353/8 |

FOREIGN PATENT DOCUMENTS

| | | |
|---|---|---|
| GB | 2403814 A | 1/2005 |
| WO | 9852359 | 11/1998 |
| WO | 03015424 A2 | 2/2003 |
| WO | 03046326 A2 | 6/2003 |
| WO | 2005006774 A1 | 1/2005 |
| WO | 2006056897 A1 | 6/2006 |

\* cited by examiner

AUTOSTEREOSCOPIC DISPLAY DEVICE AND A SYSTEM USING THE SAME

FIELD OF THE INVENTION

This invention relates to a display and system of the type that displays images, and more particularly to an autostereoscopic display and display system for displaying multiple views.

BACKGROUND OF THE INVENTION

Figure 1:
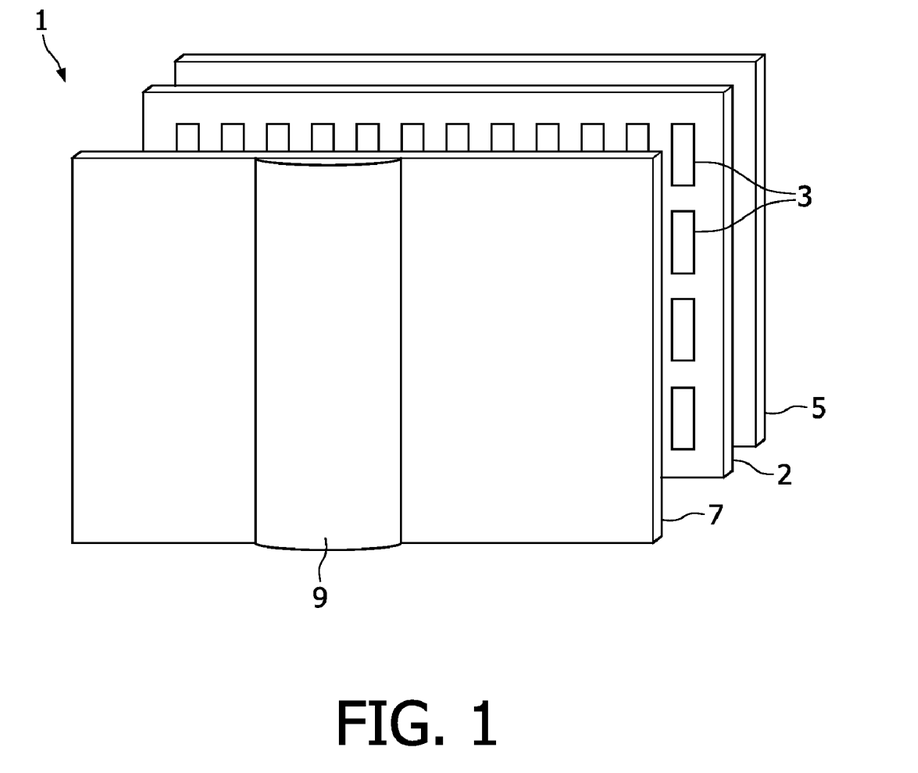
FIG. 1 is a schematic perspective view of a known autostereoscopic display device.

A known autostereoscopic display device is illustrated in FIG. 1. This known device 1 comprises a two dimensional liquid crystal display panel 2 having a row and column array of display pixels 3 acting as a spatial light modulator to produce the display. For the sake of clarity, only a small number of display pixels 3 are shown in the Figure. In practice, the display panel 2 might comprise about one thousand rows and several thousand columns of display pixels 3.

The structure of the liquid crystal display panel 2 is entirely conventional. In particular, the panel 2 comprises a pair of spaced transparent glass substrates, between which an aligned twisted nematic or other liquid crystal material is provided.

Each display pixel 3 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 2 is illuminated by a light source 5 comprising, in this case, a planar backlight extending over the area of the display pixel array. Light from the light source 5 is directed through the display panel 2, with the individual display pixels 3 being driven to modulate the light and produce the display.

The display device 1 also comprises a lenticular sheet 7, arranged over the display side of the display panel 2, which performs a view forming function. The lenticular sheet 7 comprises an array of lenticular elements 9 extending parallel to one another, of which only one is shown with exaggerated dimensions for the sake of clarity.

Thus, an array of elongate lenticular elements 9 extending parallel to one another overlies the display pixel array, and the display pixels 3 are observed through these lenticular elements 9.

The lenticular elements 9 act as a light output directing means to provide different images, or views, from the display panel 2 to the eyes of a user positioned in front of the display device 1. The above described device provides an effective three dimensional display device.

In an arrangement in which, for example, each lenticular element 9 is associated with two columns of display pixels 3, the display pixels 3 in each column provide a vertical slice of a respective two dimensional sub-image. The lenticular sheet 7 directs these two slices and corresponding slices from the display pixel columns associated with the other lenticular elements 9, to the left and right eyes of a user positioned in front of the sheet, so that the user observes a single stereoscopic image.

However, use of a liquid crystal display panel is generally limited to display devices below a certain size and is not cost-effective for large screen sizes. Thus, for applications which require a large screen size, such as home cinema or public displays, there remains a need to provide a cost-effective 3-dimensional (3D) display solution.

For display applications requiring a large screen size, it is known to use a projection-based display system in which images are projected on to a large flat panel or screen using a projector (positioned either in front of or behind the panel/screen).

It is also known to employ two projectors in order to create a 3D or stereoscopic projection-based display from a stereoscopic pair of images. In such systems, the two projectors each project an image using light having a state of polarization that is orthogonal to that of the other projector. The projection screen is arranged to conserve the state of polarization of the projected light and, by means of polarizing glasses which select one state of polarization for one eye and the other state of polarization for the other eye, the two overlapping images are perceived so that the user observes a single stereoscopic image.

Although this method provides good 3D depth perception, the method relies on the user wearing special glasses, which is undesirable.

Other known 3D projection-based display systems require the use of many projectors, each projector being responsible for one view of a multi-view 3D image. In addition to being highly expensive, these systems have the disadvantage of being unreliable since the light source in each projector (typically a Ultra-High Performance lamp) has a limited lifetime and predicting its end-of-life is practically impossible.

SUMMARY OF THE INVENTION

It is therefore desirable to create a 3-D display system that is suitable for large screen sizes and which suffers less from the above-mentioned disadvantages.

According to the invention, there is provided an autostereoscopic display device comprising:

a reflection layer for reflecting at least a portion of incident light;

a polarization conversion layer arranged over the reflection layer; and an array of lenticular elements arranged over at least a portion of the polarization conversion layer and including a birefringent material, wherein light having a first state of polarization is arranged to pass through the lenticular element array without lenticular element focusing, and wherein the polarization state is transformed by the polarization conversion layer such that the reflected light has a second state of polarization arranged to pass through the lenticular element array with lenticular element focusing to provide multiple views.

It will be appreciated by those skilled in the art that some lenticular element focussing of light having the first state of polarization may be tolerated in some instances.

According to another aspect of the invention there is also provided an autostereoscopic display system comprising: an image projector; and an autostereoscopic display device according to the invention, wherein the image projector is adapted to provide an image comprising light having the first state of polarization.

The arrangement enables a single projector to be used to provide a 3D autostereoscopic projection display. The image reaches the reflector without distortion by the lenticular array by virtue of the polarization of the image. The reflected image can be considered to be a normal image source. This image undergoes polarization conversion, so that the lenticular array then performs its focusing function, and a 3D display output, with any number of views, can be generated in the same way as for an LCD autostereoscopic display device.

The first state of polarization is preferably substantially orthogonal to an extraordinary axis of the birefringent material, and the second state of polarization is substantially parallel to the extraordinary axis. This gives the two modes, one for the incident light and one for the reflected light. The polarization conversion layer preferably comprises a quarter-wave retarder.

An at least partially transparent diffusion layer can be arranged between the reflection layer and the polarization conversion layer.

A second polarization conversion layer can be arranged over the lenticular array and adapted to transform circularly polarized incident light into linearly polarized light. This enables the projector to display an image with circularly polarised light.

The lenticular array can comprise a transparent planarization layer arranged over the lenticular elements. In this case, the material forming the lenticular element can be birefringent, and the planarization layer is then isotropic and has a refractive index which is equal to an ordinary refractive index of the lenticular element birefringent material. Thus, for light of one linear polarization direction, there is no refractive index boundary at the lens surface. In an inverse arrangement, the material forming the lenticular elements is isotropic, and the planarization layer is birefringent and has one of its refractive indices equal to that of the lenticular elements.

The birefringent material may be switchable by selective application of an electric field so as switch the display between 2D and 3D modes of operation. This can function in the same way as for switchable LCD autostereoscopic displays. The material may then comprise LC material.

The projector is preferably arranged to project polarised light towards the side of the display that is most remote from the refection layer, and the (first) state of polarization is substantially orthogonal to the extraordinary axis of the birefringent material.

The display system may further comprise a calibration system for correcting geometrical misalignments of the projected light with the display, for example a camera for detecting an image produced by the display. A geometry correction unit can be arranged to receive information from the camera and to modify the light projected by the projector according to the received information so as to reduce misalignments of the projected light with the display.

The invention also provides a method of projecting a 3D image, comprising:

projecting an image comprising light having a first state of polarization onto a reflector arrangement;

passing the image through a birefringent lenticular element array of the reflector arrangement without substantial lenticular element focusing as a result of the first state of polarization;

reflecting the image and performing a polarization conversion of the light of the image to a second state of polarization;

passing the image through the birefringent material lenticular element array with lenticular element focusing as a result of the second state of polarization, to provide multiple views to different viewing locations.

The invention also provides a method of calibrating a display, the display comprising: an autostereoscopic display that is arranged to provide multiple images by reflecting and transforming incident light having a first state of polarization into outgoing light having a second state of polarization which is orthogonal to the first state of polarization; and a projector arranged to project polarised light towards the display, wherein the method comprises the steps of:

projecting a test pattern towards the display;

detecting an image produced by the display in response to the projected test pattern;

adjusting at least one projection property of the projector according to the detected image.

BRIEF DESCRIPTION OF THE DRAWINGS

An embodiment of the invention will now be described, purely by way of example, with reference to the accompanying drawings, in which.

Like reference numerals refer to like elements throughout.

DETAILED DESCRIPTION OF EMBODIMENTS

The invention provides a display which is adapted to display a 3-D image when light is projected onto it from a single projector. The display provides multiple images by reflecting and transforming incident light having a first state of polarization into outgoing light having a second state of polarization which is orthogonal to the first state of polarization. By arranging the reflected and transformed light having a second state of polarization to pass through birefringent lenticular means having an extraordinary axis which is parallel to the second state of polarization, the reflected and transformed light is refracted by the birefringent lenticular means to create multiple images that can be perceived as a 3D image.

Figure 2:
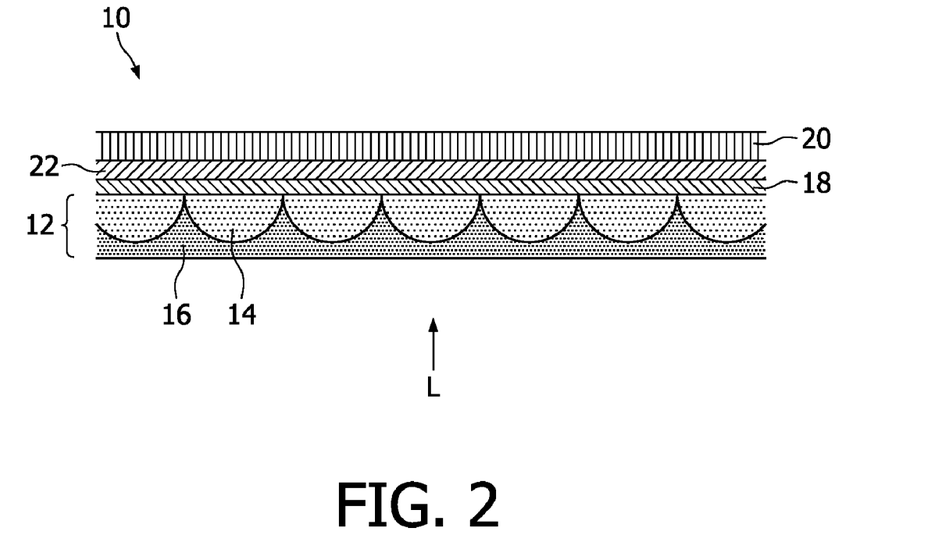
FIG. 2 is a cross-sectional view of a display according to a first embodiment of the invention.

Referring to FIG. 2, a cross-sectional view of a display 10 according to a first embodiment of the invention is shown. The display 10 comprises a birefringent lenticular layer 12 comprising an array of transparent lenticular elements 14 arranged in parallel and a transparent planarization layer 16 adjacent to the curved surfaces of the lenticular elements 14. In the embodiment of FIG. 2, the lenticular elements 14 have birefringent properties.

The lenticular elements 14 have a high index of refraction for light polarized in the same plane as the display (e.g. in a plane coming vertically out of the plane of FIG. 2). This is the so-called extraordinary index of refraction $n_e$ and, in the embodiment of FIG. 2, the lenticular elements 14 have an extraordinary index of $n_e=1.7$. The index of refraction for light polarized perpendicular to this direction is lower and is known as the ordinary index of refraction $n_o$. This perpendicular direction is substantially the direction of light output from the display. The lenticular elements 14 in FIG. 2 have an ordinary index of $n_o=1.5$. The planarization layer 16 of FIG. 2 has isotropic optical properties and its index of refraction n is matched to that of the ordinary index of refraction of the lenticular (i.e. n=1.5).

It is not essential, however, that the lenticular elements 14 have birefringent properties. In an alternative embodiment, the lenticular elements 14 may have isotropic properties, whereas the planarization 16 layer is birefringent.

The display also comprises an at least partially transparent diffuser 18. The diffuser 18 is disposed on the birefringent layer 12 such that it is adjacent to the array of lenticular elements 14 and on the side of the birefringent lenticular layer 12 that is opposite the planarization layer 16 (i.e. the side of birefringent lenticular layer 12 that is remote from a viewing direction). In other words, the diffuser 18 is formed on the birefringent lenticular layer 12 such that the array of lenticular elements 14 is sandwiched between the diffuser 18 and the planarization layer 16.

The diffuser 18 is adapted to diffuse light that passes through it without destroying the state of polarization of the light. An example of a suitable diffuser 18 is diffusing film that is available from a company called Microsharp.

It should, however, be appreciated that provision of a diffuser 18 is purely optional, although preferable.

Further, instead of a diffuser, one can arrange the reflection layer 20 to have a fine pattern of grooves in the vertical direction, such that it has the effect of a diffuser in the horizontal direction. This will not affect the state of polarization of the light.

The display 10 further comprises a reflection layer 20 separated from the diffuser 18 by a quarter-wave retarder 22. Thus, the reflection layer 20 covers the birefringent lenticular layer 12 and is separated from the lenticular elements 14 of the birefringent lenticular layer 12 by the diffuser 18 and the quarter-wave retarder 22.

It is preferable that the reflection layer 20 is arranged to reflect as much incident light as possible. It may also be preferable that reflection layer 20 is arranged to diffuse the light to some extent without destroying the well-defined state of polarization of the light, for example in an embodiment of the display which does not comprise a diffuser 18.

An optical retarder is a polarization form converter. In general an optical retarder is a synthetic material that is stretched to make it birefringent. Typically, an optical retarder is a transparent, oriented polyvinyl alcohol film laminated to a cellulose acetate butyrate substrate. An optical retarder has two principal axes, slow and fast, and is adapted to resolve a light beam into two polarized components (the one parallel to the slow axis lags the one parallel to the fast axis). The retarder then recombines the two polarized components to form a single emerging beam of a specific polarization form.

Figure 3:
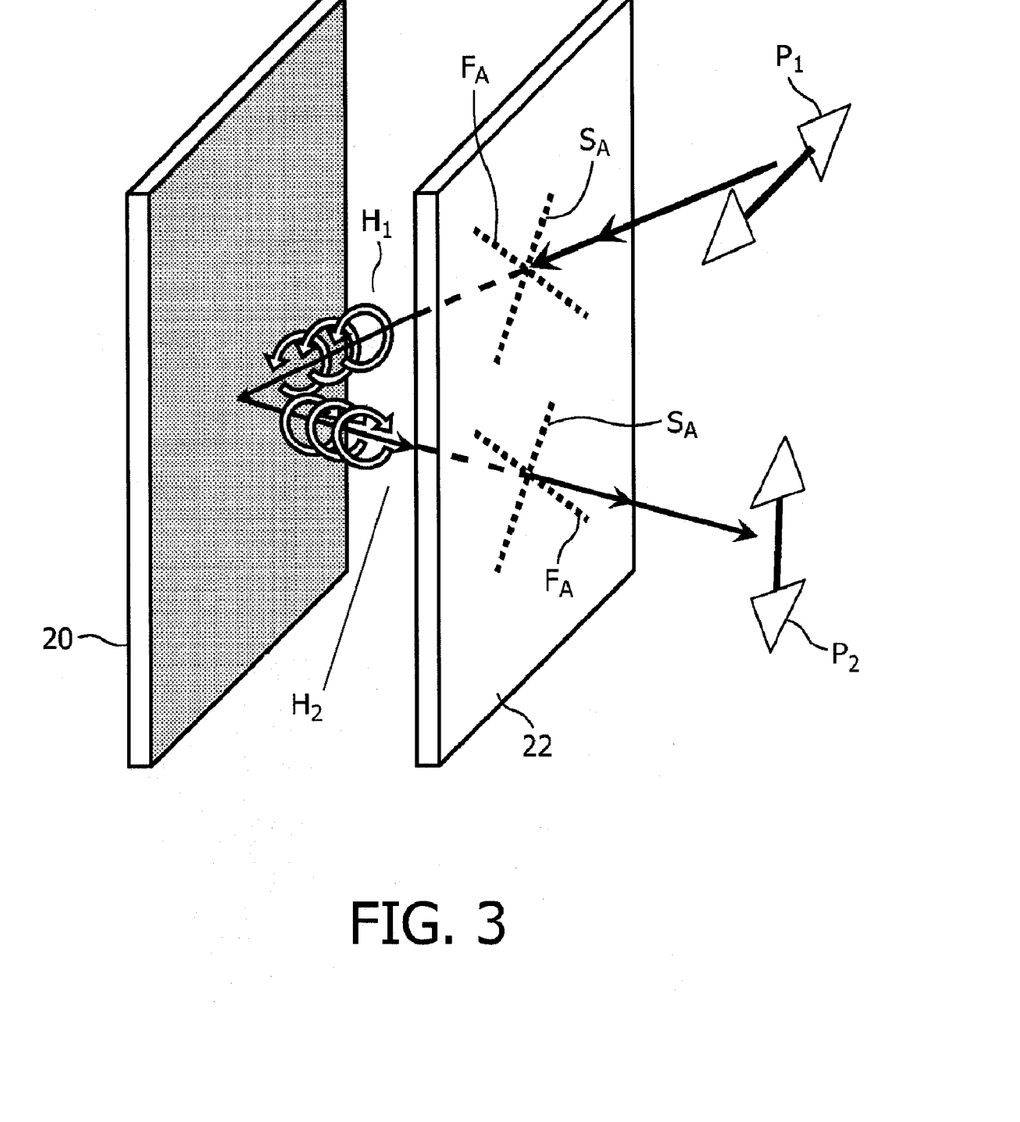
FIG. 3 is a schematic illustration depicting the principle of how a quarter-wave retarder can be employed to transform polarised light.

Referring now to FIG. 3, by arranging the quarter-wave retarder 22 such that its slow $S_A$ and fast $F_A$ axes are at 45° to the axis $P_1$ of the polarization of incident light, a ray of the incident polarised light that passes through the retarder 22 has its vibration direction moved in a helical pattern $H_1$. If the same light ray is then reflected from a specular surface, such as the reflection layer 20, the rotation of the vibration reverses (as indicated by $H_2$). This rotation is stopped in the return through the retarder 22. The light ray is then polarized orthogonally $P_2$ to its original polarization plane $P_1$.

Returning to FIG. 2, light (indicated generally by the arrow labelled "L") originating from a projector is linearly polarized, with the direction of polarization being perpendicular to the extraordinary axis of the lenticular elements 14.

Thus, it will be understood that the incident light L passes through the birefringent lenticular layer 12 without being refracted (i.e. there is no lens action) and is partially diffused as it passes thought the diffuser 18.

The linearly polarised light then passes through the quarter-wave retarder 22 and has its vibration direction rotated before it is incident on, and reflected by, the reflection layer 20. As explained above with reference to FIG. 3, the rotation of the vibration of the reflected light is reversed and the reflected light passes back through the quarter-wave retarder 22 and emerges from the quarter-wave retarder 22 with its polarization direction being perpendicular to that of the incident light L and parallel to the extraordinary axis of the lenticular elements 14.

Therefore, after being reflected by the reflection layer 20 and transformed by the quarter-wave retarder 22, the light is then refracted as it passes back through the birefringent lenticular layer 12. In other words, for light that has been reflected by the reflection layer 20 and passed back through the quarter-wave retarder 22, the birefringent lenticular layer 12 behaves like a true lenticular, creating a number of images or views which can then be perceived as a 3D image.

Figure 4:
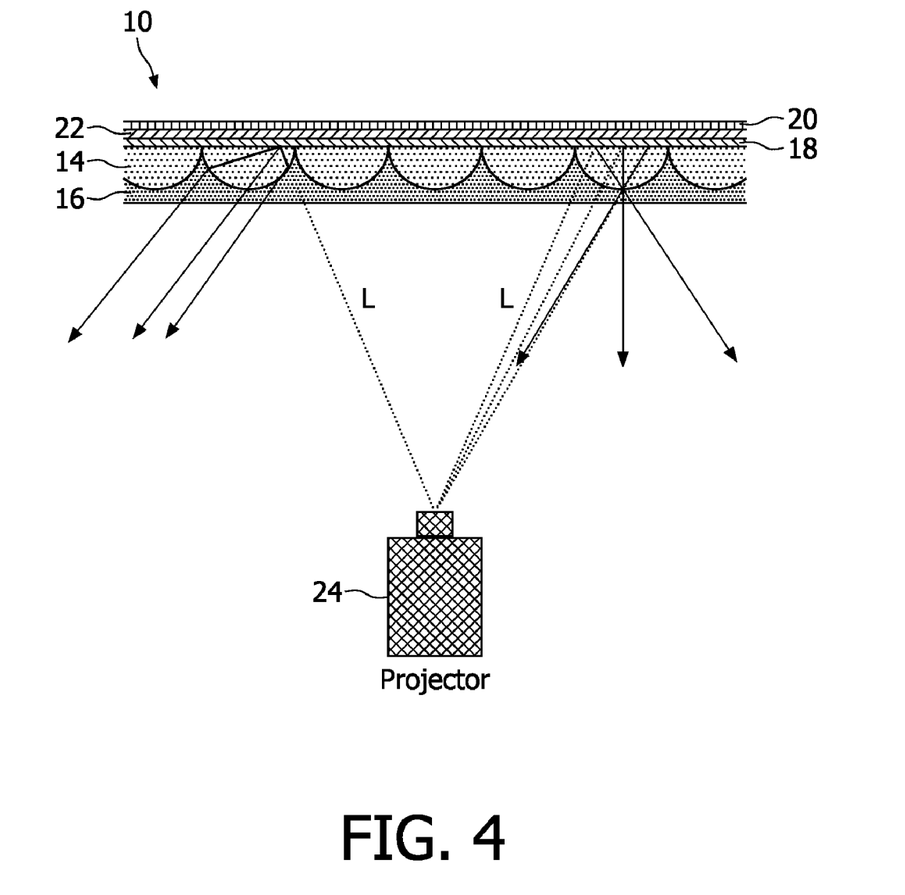
FIG. 4 illustrates the display of FIG. 2 being used as part of a front-projection display system according to the invention.

This can be further appreciated form FIG. 4, which illustrates the display of FIG. 2 being used as part of a front-projection display system according to the invention.

A single projector 24 is employed and outputs linearly polarised light towards the screen. The polarization direction of the light L is arranged to be perpendicular to the extraordinary axis of the lenticular elements 14. The projected light L is incident to birefringent lenticular layer 12 and passes the interface between the planarization layer 16 and the array of lenticular elements 14 without being refracted. The light is then transformed and reflected such it passes back through the birefringent lenticular layer 12 with its polarization directions being substantially orthogonal to the polarization direction of the light L projected by the projector 24 (and substantially parallel to the extraordinary axis of birefringent lenticular layer 12).

Thus, the light passing back through the birefringent lenticular layer 12 is refracted at the interface of the lenticular elements 14 and the planarization layer 16 so as to create different images, or views, from the display 10 to the eyes of a user positioned on the same side of the display as the projector 24.

Further, the birefringent lenticular layer 12 may be adapted so that the orientation of the extraordinary axis of the lenticular elements 14 is switchable, thereby enabling switching of the display between 2D and 3D modes of operation. As an example, such switching may be achievable by selective application of an electric field.

It should be understood that the direction of polarization of the light leaving the projector is preferably well aligned with the orientation of the display. If this alignment is not satisfactory, cross-talk between the various views may occur.

To address this alignment issue, an adjustable polarization-rotating element may be provided inside the projector or just in front of it. Using this, the orientation of the polarization of the light leaving the projector may be adjusted as required.

Figure 5:
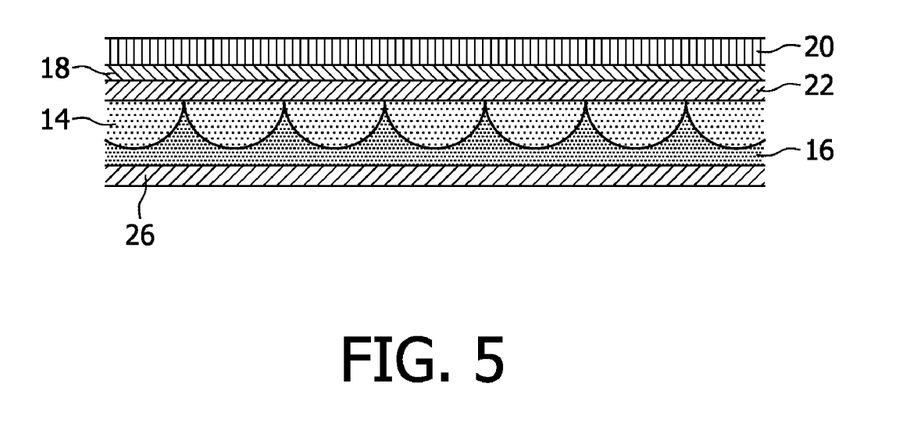
FIG. 5 is a cross-sectional view of a display according to an alternative embodiment of the invention.

Alternatively, as shown in the embodiment of FIG. 5, the display may further comprise a second quarter-wave retarder 26 arranged adjacent to the planarization layer 16 on the side of the birefringent lenticular layer 12 that is opposite the reflection layer 20 (i.e. the side of birefringent lenticular layer 12 that is closest to the viewing direction).

By arranging the second quarter-wave retarder 26 such that its slow and fast axes are at 45° to the extraordinary axis of the lenticular elements 14 of the birefringent lenticular layer 12, circularly polarized light that is incident on it (i.e. projected onto it by a projector) can be transformed into linearly polarized light having polarization direction which is substantially orthogonal to the extraordinary axis of the lenticular elements, as required.

It should also be noted that the display of FIG. 5 further differs from that of FIG. 2 in that the positions of the diffuser 18 and the quarter-waver retarder 22 have been swapped.

A potential issue with a system such as that shown in FIG. 4 is that there is no rigid physical connection between the projector 24 and the display 10. Thus, it is possible that the position of the projector 24 with respect to the screen is not well defined. Furthermore, a projected image may suffer from geometrical distortions.

In such a multi-image 3D display system, it is preferable for the geometry of the projected image to be well aligned with respect to the birefringent lenticular layer 12 of the screen. This alignment should be preferably accurate to the level of the horizontal dimension of an image pixel or better. It may therefore be desirable to employ a calibration system with feedback control in order to provide improved alignment.

Figure 6:
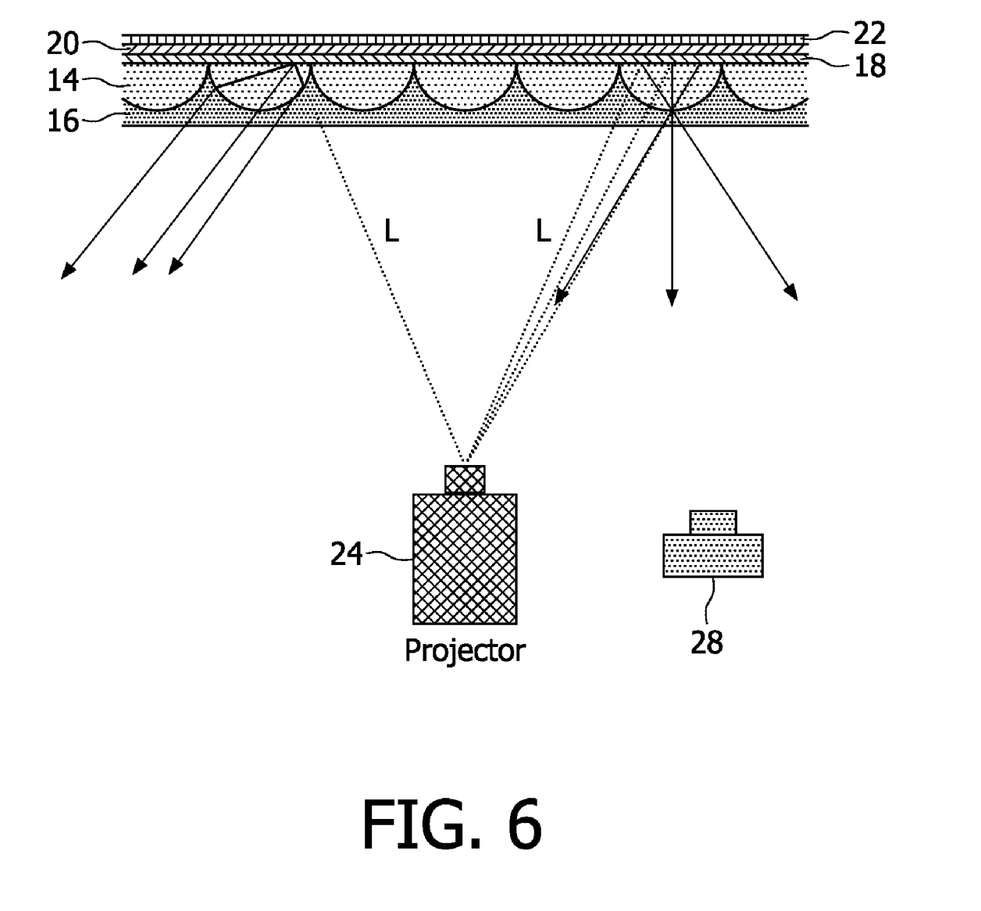
FIG. 6 shows a modification to the display system of FIG. 4.

A display system according to an embodiment of the invention is shown in FIG. 6.

The display system is similar to that shown in FIG. 4, but differs in that it further comprises a camera 28 located in close vicinity to the projector 24. Although the camera 28 is shown as being provided separately from the projector, the camera may, in fact, be incorporated within the projector. Indeed, it is preferable for the projector 24 to be provided with a through-the-lens camera.

Figure 7A:
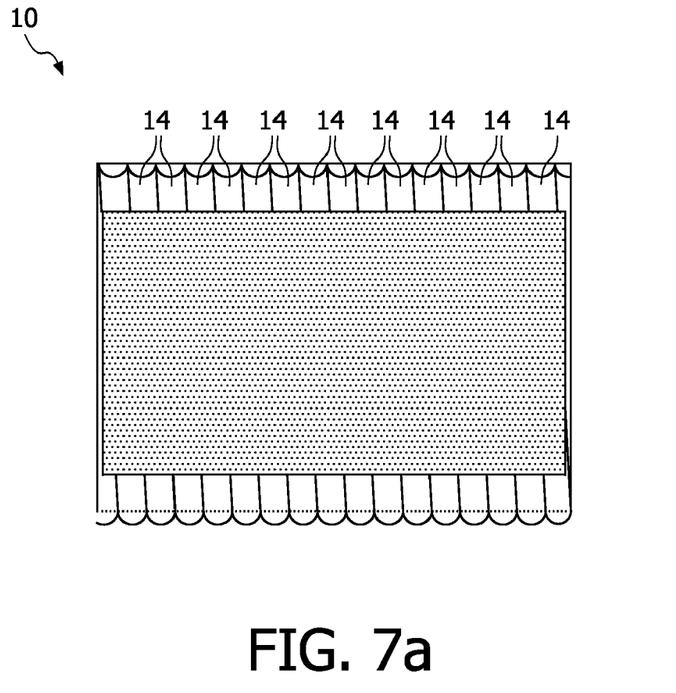
FIG. 7a illustrates a display according to the invention displaying a uniform pattern in response to a test pattern projected towards it.

In order to calibrate the display system, a test pattern is projected onto the display 10. The test pattern can be a uniform image corresponding to one view only (for example the centre view) and all other views being black. For such a test pattern, the alignment of the system is assessed by checking if the camera sees a projection screen that is uniformly illuminated, as illustrated in FIG. 7a. If there is a mismatch between the geometry of the projected image and the geometry of the display (i.e. the lenticular elements 14), a non-uniform illumination pattern will be seen by the camera.

Figure 7B:
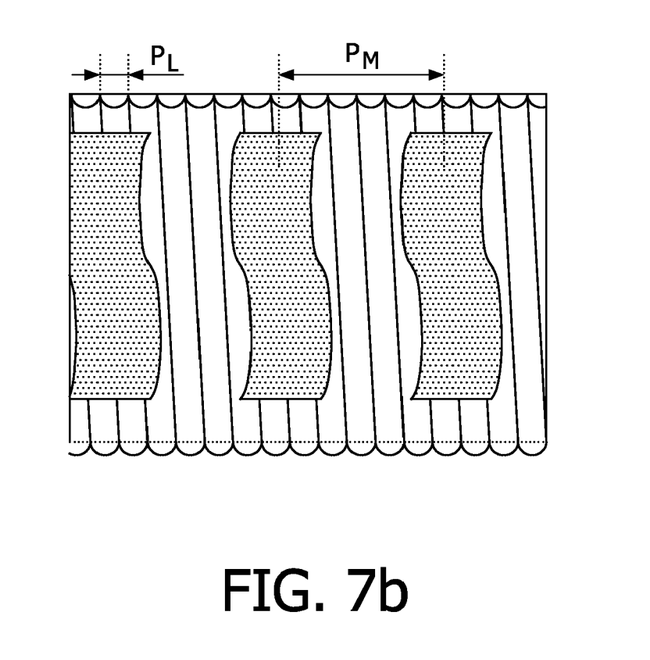
FIG. 7b illustrates a display according to the invention displaying a moiré pattern in response to a test pattern projected towards it.

An example of a non-uniform illumination pattern which may indicate misalignment of the system may be similar to that depicted in FIG. 7b. In FIG. 7b, the depicted pattern results from the fact that the horizontal magnification of the projector is not adequately set according to the pitch of the lenticular elements 14 of the display 10 (for example, because the distance of the projector 24 to the display 10 does not match a predetermined distance).

The resultant pattern is a moiré pattern (also called aliasing or beat pattern), wherein the pattern has a period $P_M$, and the pitch of the lenticular elements 14 is $P_L$. The camera, in combination with an appropriately arranged program or processing unit is able to relate $P_M$ to $P_L$ on a relative scale. Accordingly, the ratio $(P_M \pm P_L)/P_M$ can define a correction factor for the horizontal magnification of the image projected by the projector.

This correction of the magnification can then be completed by re-scaling the individual views, wherein each view is expected to require the same correction.

In practice, the geometric errors may be much more complex. However, such errors can be derived from the picture taken by the calibration camera in much the same manner as discussed above.

An alternative method of calibration comprises projecting a test image for a certain view with all other views being black. The camera then captures the resulting image. This is repeated for all views, whilst keeping the position of the camera fixed. If there is no geometrical distortion of the test image, the camera will see an undistorted test image for the correct view only, all other views being black. In case there is a geometrical distortion, the information gathered this way suffices to reconstruct it.

Another method comprises projecting a test image having different colours for different views. Of course, analyzing the resulting image requires a colour camera instead of a monochrome camera, but the benefit of this method is that in principle only one test image is needed.

Preferably, calibration is undertaken during initialisation and during operation of the display system. For example, calibration during operation may be undertaken by interleaving the 3D multi-view images with test patterns at predetermined times.

Figure 8:
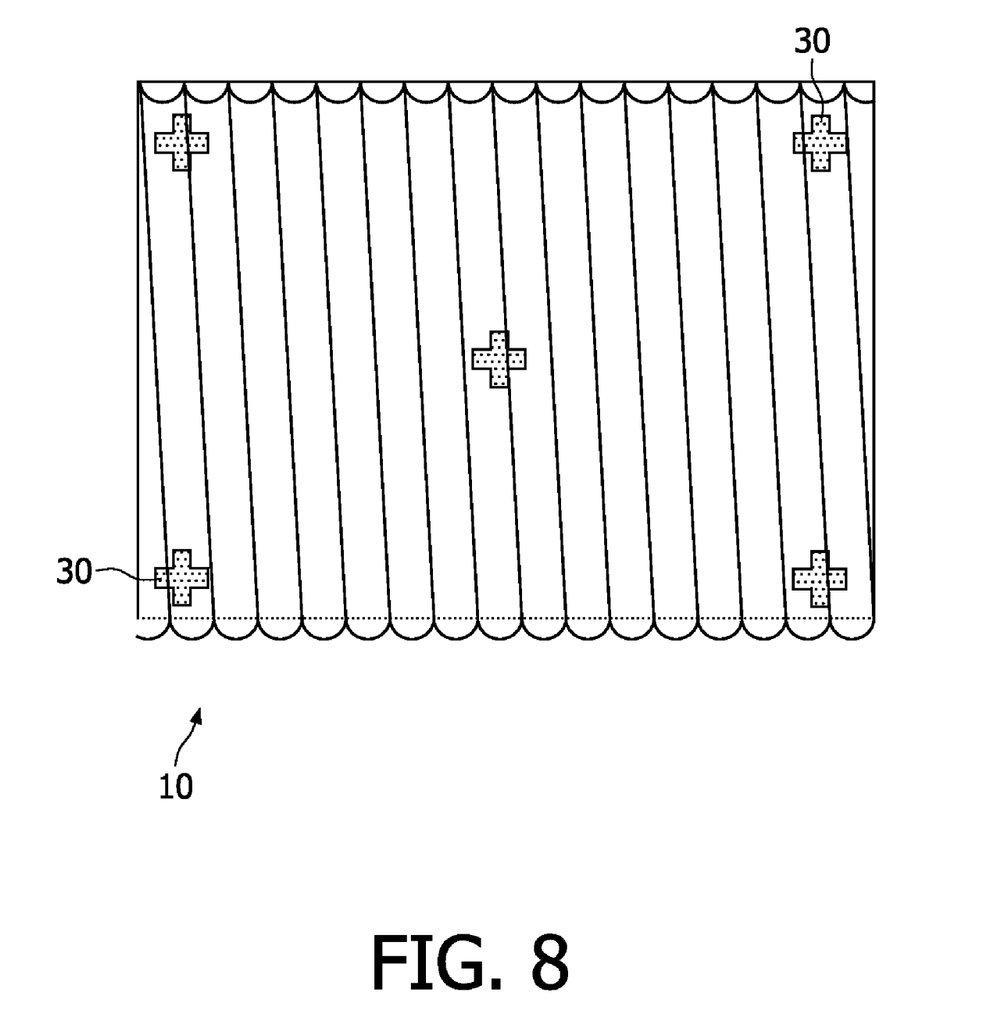
FIG. 8 shows a display according to an embodiment of the invention which comprises calibration marks.

A second class of calibration method will now be described with reference to FIG. 8. These calibration methods rely on applying passive calibration marks 30 (namely marks which form part of the display device rather than ones which are actuated) located at predetermined positions on the display 10. Using these calibration marks 30, the relative positions of marks in a test image can be determined using a camera and related to what is being projected onto the screen by the projector. Alternatively, since the calibration marks consist of a periodic pattern, a similar pattern can be used in a projected test image. A moiré pattern that is resultant from interference between the marks and the test image, as captured by a camera, will then provide the necessary geometrical information for the geometrical distortion of the test image to be determined.

A third class of calibration method relies on the use of a projection screen with active calibration marks (namely marks which are actuated as part of the calibration scheme). For example, photo-diodes may be incorporated into the display at predetermined positions. By geometrically distorting a test image such as to result in a maximum (or minimum) total signal as produced by the photodiodes, the signal results in a maximum (or minimum) value when the geometry of the test image is commensurate with the geometry of the lenticular.

Of course, it will be understood that more than one calibration method may be combined. Indeed, employing a combination of such methods may be preferable so as to provide improved levels of accuracy.

Figure 9:
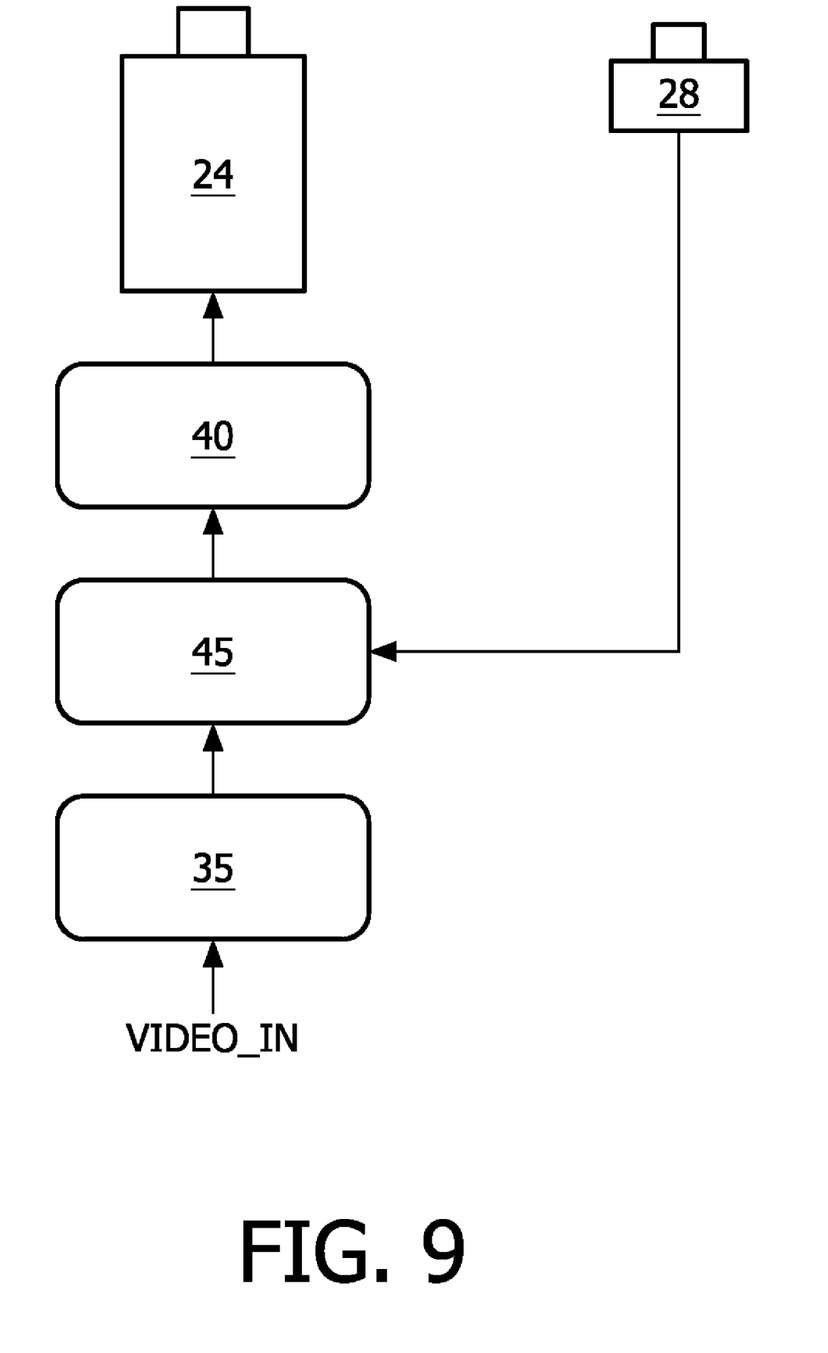
FIG. 9 is a block diagram of a calibration system according to the invention.

FIG. 9 shows a schematic block diagram of a calibration system according to an embodiment of the invention. The calibration system includes a video pre-processing unit 35 connected to a video post-processing unit 40 via a correction unit 45. Also connected to the correction unit is a camera 28 for detecting an image produced by a display.

The video pre-processing unit 35 is arranged to receive a VIDEO_IN signal as input and performs initial processing on the VIDEO_IN signal. For example, initial processing may comprise digitising an analog input signal. The video pre-processing unit 35 then outputs the pre-processed signal to the correction unit 45.

Based on information received from the camera 28, the correction unit 45 further processes the pre-processed signal it received from the video pre-processing unit 35 in order to reduce any misalignment between an associated projector and display. Such correction processing may include altering the geometric properties or magnification of the video signal.

The corrected video signal is then output from the correction unit 45 to the video post-processing unit 40 which performs final processing on the video signal. For example, the final processing undertaken by the video post-processing unit 40 may include processing steps which are necessary for the video signal to be presented in a suitable format for projection by a projector.

Accordingly, once the video signal has undergone final processing by the video post-processing unit 40, the video post-processing unit 40 outputs the final video signal for display to a projector 24. The projector 24 then projects the video signal towards a display according to the invention, wherein the video signal that is projected has been corrected by the calibration system so as to reduce misalignment between the projector 24 and the display.

Summarizing an autostereoscopic display device comprises a reflection layer for reflecting at least a portion of incident light, a polarization conversion layer arranged over the reflection layer, and an array of lenticular elements arranged over at least a portion of the polarization conversion layer and including a birefringent material. Light having a first state of polarization is arranged to pass through the lenticular element array without substantial lenticular element focusing, wherein the polarization state is transformed by the polarization conversion layer such that the reflected light has a second state of polarization arranged to pass through the lenticular element array with lenticular element focusing to provide multiple views.

It should be noted that the above-mentioned embodiments illustrate rather than limit the invention, and at that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. An autostereoscopic display device comprising:
  a reflection layer for reflecting at least a portion of incident light as reflected light;
  a polarization conversion layer arranged over the reflection layer;
  an array of lenticular elements arranged over at least a portion of the polarization conversion layer and including a birefringent material; and
  an at least partially transparent diffusion layer arranged between the reflection layer and the polarization conversion layer,
  wherein light having a first state of polarization is arranged to pass through the lenticular element array without lenticular element focusing, and wherein the polarization state is transformed by the polarization conversion layer such that the reflected light has a second state of polarization arranged to pass through the lenticular element array with lenticular element focusing to provide different views to different viewing locations so that a first view is provided to a first location and a second view is provided to a second location.

2. The display device as claimed in claim 1, wherein the first state of polarization is orthogonal to an extraordinary axis of the birefringent material, and the second state of polarization is parallel to the extraordinary axis.

3. The display device as claimed in claim 1, wherein the polarization conversion layer comprises a quarter-wave retarder.

4. The display device as claimed in claim 1, further comprising a second polarization conversion layer arranged over the lenticular array and adapted to transform circularly polarized incident light into linearly polarized light.

5. The display device as claimed in claim 1, wherein the lenticular array comprises a transparent planarization layer arranged over the lenticular elements.

6. The display device as claimed in claim 5, wherein the material forming the lenticular elements is birefringent, and the planarization layer is isotropic and has a refractive index which is equal to an ordinary refractive index of the lenticular element birefringent material.

7. The display device as claimed in claim 5, wherein the material forming the lenticular elements is isotropic, and the planarization layer is birefringent and has one of its refractive indices equal to a refractive index of the lenticular elements.

8. The display device as claimed in claim 1, wherein the birefringent material is switchable by selective application of an electric field so as switch the display between 2D and 3D modes of operation.

9. The display device as claimed in claim 2, wherein the extraordinary axis of the birefringent material is parallel to a longitudinal axis of the lenticular elements.

10. An autostereoscopic display system comprising:
  an image projector; and
  an autostereoscopic display device according to claim 4,
  wherein the image projector is configured to provide an image comprising light having the first state of polarization.

11. The display system as claimed in claim 10, wherein the projector is configured to project light which is circularly polarized.

12. The display system as claimed in claim 10, further comprising a calibration system for correcting geometrical misalignments of the projected light with the display device.

13. The display system as claimed in claim 12, wherein the calibration system comprises a camera for detecting an image produced by the display.

14. The display system as claimed in claim 13, wherein the calibration system further comprises a geometry correction unit which is arranged to receive information from the camera and to modify the light projected by the projector according to the received information so as to reduce misalignments of the projected light with the display.

15. A method of projecting a 3D image, comprising the acts of:
  projecting an image comprising light having a first state of polarization onto a reflector arrangement through an at least partially transparent diffusion layer;
  passing the image through a birefringent lenticular element array of the reflector arrangement without substantial lenticular element focusing as a result of the first state of polarization;
  reflecting the image by the reflection arrangement;
  performing a polarization conversion of the light of the image to a second state of polarization by a polarization conversion layer;
  passing the image having the second state of polarization through the birefringent material lenticular element array with lenticular element focusing to provide multiple views to different viewing locations so that a first view is provided to a first location and a second view is provided to a second location.

16. The method as claimed in claim 15, further comprising the act of performing a calibration, wherein the calibration comprises the acts of:
projecting a test pattern towards the display;
detecting a test image produced by the display in response to the projected test pattern; and
adjusting at least one projection property of a projector according to the detected test image.

17. The method as claimed in claim 15, wherein the detecting act comprises the act of detecting a moiré pattern having a period $P_M$, and the adjusting act comprises the act of adjusting a horizontal magnification of the projector using a ratio $(P_M \pm P_L)/P_M$, wherein $P_L$ is a pitch of the birefringent lenticular element array.

18. An autostereoscopic display device comprising:
a reflection layer for reflecting at least a portion of incident light as reflected light;
a polarization conversion layer arranged over the reflection layer;
an array of lenticular elements arranged over at least a portion of the polarization conversion layer and including a birefringent material; and
an at least partially transparent diffusion layer arranged over the polarization conversion layer so that the polarization conversion layer is between the at least partially transparent diffusion layer and the reflection layer,
wherein light having a first state of polarization is arranged to pass through the lenticular element array without lenticular element focusing, and wherein the polarization state is transformed by the polarization conversion layer such that the reflected light has a second state of polarization arranged to pass through the lenticular element array with lenticular element focusing to provide different views to different viewing locations so that a first view is provided to a first location and a second view is provided to a second location.

19. The method of claim 15, wherein the polarization conversion layer is between the at least partially transparent diffusion layer and the reflection arrangement.

20. The method of claim 15, wherein the at least partially transparent diffusion layer is between the polarization conversion layer and the reflection arrangement, and wherein the method further comprises the act of converting a circularly polarized light from a projector to the first state of polarization by a further polarization conversion layer.

* * * * *